US012080058B2

(12) United States Patent
Huang et al.

(10) Patent No.: US 12,080,058 B2
(45) Date of Patent: Sep. 3, 2024

(54) SYSTEM FOR REAL-TIME TARGET IDENTIFICATION OF UNMANNED AERIAL VEHICLE BASED ON EMBEDDED TECHNIQUE AND IMPROVED YOLO4 ALGORITHM

(71) Applicant: University of Electronic Science and Technology of China, Chengdu (CN)

(72) Inventors: Fang Huang, Chengdu (CN); Shengyi Chen, Chengdu (CN); Shuying Peng, Chengdu (CN); Yinjie Chen, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 129 days.

(21) Appl. No.: 17/903,447

(22) Filed: Sep. 6, 2022

(65) Prior Publication Data

US 2024/0078802 A1    Mar. 7, 2024

(51) Int. Cl.
| | | |
|---|---|---|
| G06T 7/20 | (2017.01) | |
| B64C 39/02 | (2023.01) | |
| G06V 10/94 | (2022.01) | |
| G06V 20/17 | (2022.01) | |
| H04N 23/661 | (2023.01) | |
| H04N 23/667 | (2023.01) | |
| H04W 4/029 | (2018.01) | |
| B64U 101/30 | (2023.01) | |

(52) U.S. Cl.
CPC ............ *G06V 10/95* (2022.01); *B64C 39/024* (2013.01); *G06T 7/20* (2013.01); *G06V 20/17* (2022.01); *H04N 23/661* (2023.01); *H04N 23/667* (2023.01); *H04W 4/029* (2018.02); *B64U 2101/30* (2023.01); *G06T 2207/10032* (2013.01)

(58) Field of Classification Search
CPC .......... G06N 3/045; G06N 3/04; G06N 3/063; G06N 3/082; G06N 3/084; G06N 3/02; G06N 20/00; G06N 20/10; G06N 3/0495; G06T 1/20
USPC ......................................................... 348/144
See application file for complete search history.

(56) References Cited

U.S. PATENT DOCUMENTS 10,914,590 B2 *  2/2021  Zhou ...................... G01C 21/20
10,991,258 B2 *  4/2021  Huang .................... G06N 20/00
(Continued)

FOREIGN PATENT DOCUMENTS

EP            3163394 A1 *  5/2017  ........... B64C 39/024

*Primary Examiner* — Masum Billah
(74) *Attorney, Agent, or Firm* — Notaro, Michalos & Zaccaria P.C.

(57) ABSTRACT

A system for real-time target identification of an unmanned aerial vehicle (UAV) based on an embedded technique and an improved YOLO4 algorithm, and relates to the field of real-time target detection is disclosed. The system for real-time target identification of a UAV based on an embedded technique and an improved YOLO4 algorithm abandons a conventional "one-to-one" mode, and can be used for a plurality of UAV data processing applications, and multiple users in different geographical locations can further remotely manage and control the system. Particularly, in a target identification client of the present disclosure, to obtain a better real-time identification effect, a YOLOv4 target identification algorithm is improved, so that a better identification result and a faster identification speed are obtained.

3 Claims, 1 Drawing Sheet

(56) References Cited

U.S. PATENT DOCUMENTS

2022/0171410 A1* 6/2022 Amsili ................. G05D 1/0094
2022/0238029 A1* 7/2022 Li ......................... B64U 10/14
2023/0410662 A1* 12/2023 Sha ........................ H04W 4/40

* cited by examiner

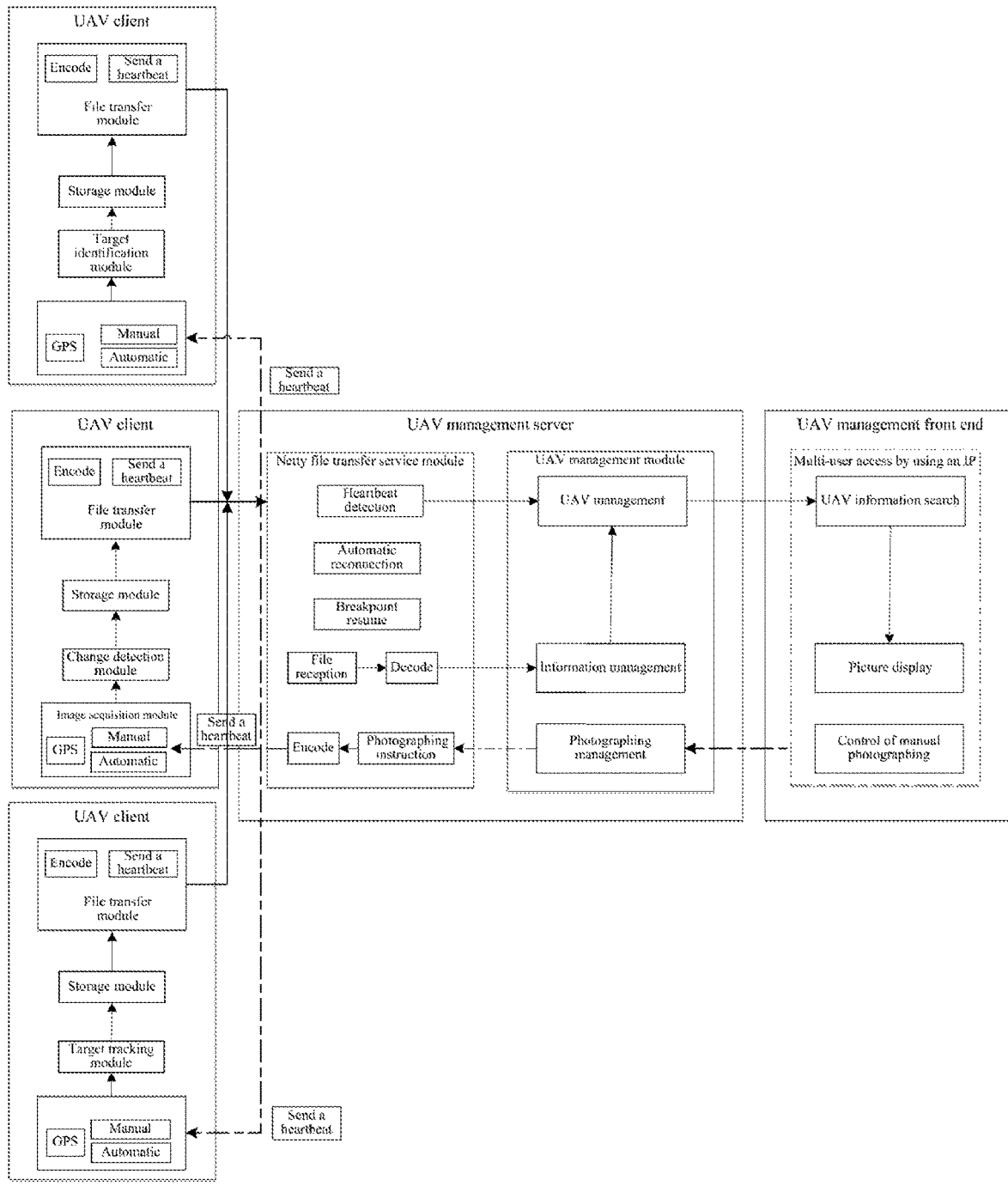

SYSTEM FOR REAL-TIME TARGET IDENTIFICATION OF UNMANNED AERIAL VEHICLE BASED ON EMBEDDED TECHNIQUE AND IMPROVED YOLO4 ALGORITHM

TECHNICAL FIELD

The present disclosure relates to the field of real-time target detection, and in particular, to a system for real-time target identification of an unmanned aerial vehicle (UAV) based on an embedded technique and an improved YOLO4 algorithm.

BACKGROUND

Target detection is a cutting-edge research direction integrating machine learning, computer vision, and pattern recognition, and has great application value in terms of target hunting, danger survey, etc. in the public security field. With rapid development of artificial intelligence, a UAV, as a novel carrying platform and implementation tool, has been widely used in many fields and has great development potential. In recent years, target detection and recognition based on a UAV has become a hot topic in research.

At present, in the research of target detection and recognition using a UAV platform as an image acquisition source, processing of image data may be divided into ground processing and on-board real-time processing. Conventional UAV image target detection and recognition is mainly based on ground processing. The UAV is used only as an image acquisition platform. Acquired images are sent to a local computer for target detection and recognition, and a worker needs to process the acquired images separately, which is far from a requirement of real-time recognition. In addition, the research of on-board real-time processing is also limited by rigid conditions such as algorithm selection and platform performance.

Therefore, it is very necessary to implement an automatic, real-time and multi-purpose target identification system used by multiple users and based on a UAV and an embedded technique.

SUMMARY

An objective of the present disclosure is to provide a system for real-time target identification of a UAV based on embedded technique and an improved YOLO4 algorithm in view of the problems existing in the background art. In the system for real-time target identification of a UAV according to the present disclosure, a UAV performs functions such as real-time target identification (change detection and target tracking can also be performed), global positioning system (GPS) information collection, and result transmission, an identification result is transmitted to a server in real time by using a transmission module, and multiple users access the server by using an Internet protocol (IP), so as to obtain the identification result and position information.

To achieve the foregoing objective, the present disclosure uses the following technical solutions.

A system for real-time target identification of a UAV based on an embedded technique and an improved YOLO4 algorithm, includes a UAV client, a UAV management server, and a UAV management front end, where the UAV client includes a target identification client, a change detection client, and a target tracking client, where the target identification client includes an image acquisition module, a target identification module, a storage module, and a file transfer module; the image acquisition module acquires position information and image data under vision of a UAV, the position information is acquired by a GPS module, the image data is acquired through automatic photographing or manual photographing, the automatic photographing is completed after a preset photographing interval, and the manual photographing is to photograph after a photographing instruction from the UAV management server is received; the position information and the image data obtained by the image acquisition module are transmitted to the target identification module, and the target identification module identifies a target and stores an identification result in the storage module; the file transfer module regularly scans the storage module (periodically scans the storage module based on a set time interval) to determine whether the identification result has been transmitted, encodes, if the identification result is not transmitted, the identification result in the storage module, converts an encoded identification result into a JSON data format, and transmits the data to a Netty file transfer service module; and when the transmission is idle, the target identification client regularly sends a heartbeat signal to the UAV management server (periodically sends a heartbeat signal to the UAV management server based on a set time interval), to confirm whether the target identification client is normally connected to the UAV management server;

the change detection client includes an image acquisition module, a change detection module, a storage module, and a file transfer module; the image acquisition module acquires position information and image data under vision of a UAV, the position information is acquired by the GPS module, the image data is acquired through automatic photographing or manual photographing, the automatic photographing is completed after a preset photographing interval, and the manual photographing is to photograph after a photographing instruction from the UAV management server is received; the position information and the image data obtained by the image acquisition module are transmitted to the change detection module, and the change detection module detects an image change and stores a detection result in the storage module; the file transfer module regularly scans the storage module to determine whether the detection result has been transmitted, encodes, if the detection result is not transmitted, the detection result in the storage module, converts an encoded detection result into a JSON data format, and transmits the data to a Netty file transfer service module; and when the transmission is idle, the change detection client regularly sends a heartbeat signal to the UAV management server, to confirm whether the change detection client is normally connected to the UAV management server;

the target tracking client includes an image acquisition module, a target tracking module, a storage module, and a file transfer module; the image acquisition module acquires position information and image data under vision of a UAV, the position information is acquired by the GPS module, the image data is acquired through automatic photographing or manual photographing, the automatic photographing is completed after a preset photographing interval, and the manual photographing is to photograph after a photographing instruction from the UAV management server is received; the position information and the image data obtained by the image acquisition module are transmitted to the target tracking module, and the target tracking module determines a target and stores a determining result in the storage module; the file transfer module regularly scans the storage module to determine whether the determining result has been transmitted, encodes, if the determining result is not transmitted, the determining result in the storage module, converts an encoded determining result into a JSON data format, and transmits the data to a Netty file transfer service module; and when the transmission is idle, the target tracking client regularly sends a heartbeat signal to the UAV management server, to confirm whether the target tracking client is normally connected to the UAV management server;

the UAV management server includes a Netty file transfer service module and a UAV management module, and is configured to implement heartbeat detection, breakpoint resume, file reception, photographing instruction transmission, and automatic reconnection, and the UAV management module includes UAV management, information management, and photographing management; the Netty file transfer service module receives data transmitted by the UAV client and then decodes and restores the data, and then transmits the data to the UAV management module; the UAV management module performs information management on the received results (the identification result, the detection result, and the determining result) and position information data, creates an "identification result folder", a "detection result file", and a "determining result folder", and stores corresponding results and position information into corresponding folders; the Netty file transfer service module detects a heartbeat sent by the UAV client and feeds back a current connection state, the heartbeat detection result is transmitted to the UAV management, and online information and last-heartbeat interaction information of the client are stored to the UAV management; the Netty file transfer service module can implement automatic connection between the client and the server after a network of the UAV client and the UAV management server is interrupted and then restored; when a network interruption occurs during file transfer, the Netty file transfer service module can implement continued transmission without restarting transmission, and only needs to continue transmitting an unfinished part; after receiving a "manual photographing" request from the UAV management front end, the photographing management in the UAV management module sends a photographing instruction to the Netty file transfer service module, and the Netty file transfer service module converts the photographing instruction into a JSON data format, and transmits the data to the image acquisition module by using a heartbeat, to implement manual photographing; and the UAV management front end is used to implement UAV information search, picture display, and control of manual photographing; and the UAV management front end searches a client of interest by using an IP address, to obtain online information, last-heartbeat interaction information, and results and position information data of the client, and displays the results and position information data of the client in pictures.

Further, the UAV client communicates with the UAV management server via a local area network; and the UAV management server communicates with the UAV management front end via a hypertext transfer protocol (HTTP).

Further, the UAV client is arranged on UAVs, the UAV management server and the UAV management front end are arranged on the ground, and the UAV management front end can access each client of the UAVs by using an IP.

In summary, with the foregoing technical solutions, the present disclosure achieves the following beneficial effects:

The system for real-time target identification of a UAV based on an embedded technique and an improved YOLO4 algorithm according to present disclosure abandons a conventional "one-to-one" mode, and can be used for a plurality of UAV data processing applications, and multiple users in different geographical locations can further remotely manage and control the system. Particularly, in a target identification client of the present disclosure, to obtain a better real-time identification effect, a YOLOv4 target identification algorithm is improved, so that a better identification result and a faster identification speed are obtained. Therefore, the system according to the present disclosure can effectively reduce a workload of real-time data processing based on a UAV for corresponding researchers, has simple deployment, high portability and convenience in use, and can significantly improve working efficiency of related researchers.

BRIEF DESCRIPTION OF THE DRAWINGS

FIG. 1 is a schematic structural diagram of a system for real-time target identification of a UAV based on an embedded technique and an improved YOLO4 algorithm according to the present disclosure.

DETAILED DESCRIPTION OF THE EMBODIMENTS

To make the objectives, technical solutions, and advantages of the present disclosure clearer, the present disclosure will be further described in detail below with reference to implementations and the accompanying drawings.

A system for real-time target identification of a UAV based on an embedded technique and an improved YOLO4 algorithm, includes a UAV client, a UAV management server, and a UAV management front end, where the UAV client includes a target identification client, a change detection client, and a target tracking client, where the target identification client includes an image acquisition module, a target identification module, a storage module, and a file transfer module; the image acquisition module acquires position information and image data under vision of a UAV, the position information is acquired by the GPS module, the image data is acquired through automatic photographing or manual photographing, the automatic photographing is completed after a preset photographing interval, and the manual photographing is to photograph after a photographing instruction from the UAV management server is received; if the image acquisition module receives no photographing instruction from the UAV management server, automatic photographing is performed; before the photographing, whether the GPS module can normally collect position information of a current position needs to be determined; if the position information of the current position can be normally collected, the photographing is performed normally, or else an error is returned; the position information and the image data obtained by the image acquisition module are transmitted to the target identification module, and the target identification module identifies a target and stores an identification result in the storage module; the file transfer module regularly scans the storage module (periodically scans the storage module based on a set time interval) to determine whether the identification result has been transmitted, encodes, if the identification result is not transmitted, the identification result in the storage module, converts an encoded identification result into a JSON data format, and transmits the data to a Netty file transfer service module; and when the transmission is idle, the target identification client regularly sends a heartbeat signal to the UAV management server (periodically sends a heartbeat signal to the UAV management server based on a set time interval), to confirm whether the target identification client is normally connected to the UAV management server;

the change detection client includes an image acquisition module, a change detection module, a storage module, and a file transfer module; the image acquisition module acquires position information and image data under vision of a UAV, the position information is acquired by the GPS module, the image data is acquired through automatic photographing or manual photographing, the automatic photographing is completed after a preset photographing interval, and the manual photographing is to photograph after a photographing instruction from the UAV management server is received; the position information and the image data obtained by the image acquisition module are transmitted to the change detection module, and the change detection module detects an image change and stores a detection result in the storage module; the file transfer module regularly scans the storage module to determine whether the detection result has been transmitted, encodes, if the detection result is not transmitted, the detection result in the storage module, converts an encoded detection result into a JSON data format, and transmits the data to a Netty file transfer service module; and when the transmission is idle, the change detection client regularly sends a heartbeat signal to the UAV management server, to confirm whether the change detection client is normally connected to the UAV management server;

the target tracking client includes an image acquisition module, a target tracking module, a storage module, and a file transfer module; the image acquisition module acquires position information and image data under vision of a UAV, the position information is acquired by the GPS module, the image data is acquired through automatic photographing or manual photographing, the automatic photographing is completed after a preset photographing interval, and the manual photographing is to photograph after a photographing instruction from the UAV management server is received; the position information and the image data obtained by the image acquisition module are transmitted to the target tracking module, and the target tracking module determines a target and stores a determining result in the storage module; the file transfer module regularly scans the storage module to determine whether the determining result has been transmitted, encodes, if the determining result is not transmitted, the determining result in the storage module, converts an encoded determining result into a JSON data format, and transmits the data to a Netty file transfer service module; and when the transmission is idle, the target tracking client regularly sends a heartbeat signal to the UAV management server, to confirm whether the target tracking client is normally connected to the UAV management server;

the UAV management server includes a Netty file transfer service module and a UAV management module, and is configured to implement heartbeat detection, breakpoint resume, file reception, photographing instruction transmission, and automatic reconnection, and the UAV management module includes UAV management, information management, and photographing management; the Netty file transfer service module receives data transmitted by the UAV client and then decodes and restores the data, and then transmits the data to the UAV management module; the UAV management module performs information management on the received results (the identification result, the detection result, and the determining result) and position information data, creates an "identification result folder", a "detection result file", and a "determining result folder", and stores corresponding results and position information into corresponding folders; the Netty file transfer service module detects a heartbeat sent by the UAV client and feeds back a current connection state, the heartbeat detection result is transmitted to the UAV management, and online information and last-heartbeat interaction information of the client are stored to the UAV management; the Netty file transfer service module can implement automatic connection between the client and the server after a network of the UAV client and the UAV management server is interrupted and then restored; when a network interruption occurs during file transfer, the Netty file transfer service module can implement continued transmission without restarting transmission, and only needs to continue transmitting an unfinished part; after receiving a "manual photographing" request from the UAV management front end, the photographing management in the UAV management module sends a photographing instruction to the Netty file transfer service module, and the Netty file transfer service module converts the photographing instruction into a Json data format, and transmits the data to the image acquisition module by using a heartbeat, to implement manual photographing; and the UAV management front end is used to implement UAV information search, picture display, and control of manual photographing; the UAV management front end sends the "manual photographing" request to the UAV management module by using a manual photographing button; and the UAV management front end searches a client of interest by using an IP address, to obtain online information, last-heartbeat interaction information, and results and position information data of the client, and displays the results and position information data of the client in pictures. During the display, a user first sees a thumbnail, which can be enlarged by clicking on a picture, and observes the results (the identification result, the detection result or the determining result) and position information data.

Further, the UAV client communicates with the UAV management server via a local area network. Specifically, the Netty file transfer service module keeps communication with the file transfer module of the UAV client by using a heartbeat packet, and a manual photographing instruction of the UAV management front end is also in communication by using the UAV management server and the heartbeat packet. The UAV management server communicates with the UAV management front end via an HTTP.

Further, the UAV client is arranged on UAVs (the target identification client is arranged on a UAV 1, the change detection client is arranged on a UAV 2, and the target tracking client is arranged on a UAV 3), the UAV management server and the UAV management front end are arranged on the ground, and the UAV management front end can access each client of the UAVs by using an IP.

Embodiment

In this embodiment, a target identification module, a storage module and a file transfer module in a target identification client are integrated on an NVIDIA Jetson TX2 development board 1. This device has powerful performance and is friendly to deep learning processing, and can easily deploy the improved YOLOv4 algorithm of the present disclosure and automatically implement a series of data processing operations such as target identification. An image acquisition device in the target identification client is a high-resolution charge coupled device (CCD) camera capable of automatically focusing, and transmits an acquired image to the development board 1 through serial communication. A GPS module is BeiTian-880 GPS. The development board 1 is mounted on a UAV 1. The camera is deployed on the development board 1, and camera power supply and photographing control are implemented by using a serial port. In addition, the image acquired by the camera is transmitted through serial communication to the development board 1 for identification and processing. The GPS module is deployed on the development board 1, and is powered and acquires information by using a serial port. A change detection module, a storage module and a file transfer module in a change detection client are integrated on a NVIDIA Jetson TX2 development board 2, and change detection is implemented by using a K-means algorithm. The development board 2 is mounted on a UAV 2, and the deployment of a camera and a GPS is exactly the same as that of the target identification client. A target tracking module, a storage module and a file transfer module in a target tracking client are integrated on a NVIDIA Jetson TX2 development board 3, and target tracking is implemented by using a method of heterogeneous information fusion. The development board 3 is mounted on a UAV 3, and the deployment of a camera and a GPS is exactly the same as that of the target identification client. The UAV management server of the present disclosure can manage a plurality of UAV devices (the UAV 1, the UAV 2, and the UAV 3) via a local area network, acquire data result information of each device and then create an "identification result folder", a "detection result file", and a "determining result folder", and store corresponding results and position information into corresponding folders. In addition, the UAV server is further responsible for interacting with the UAV management front end, converting the manual "photographing" of the UAV management front end into a corresponding instruction and transmitting the instruction to the UAV client, so as to implement the control of the camera by a TX2 device. The UAV management server is deployed on the ground side by using a high-performance notebook computer, and may be divided into a Netty file transfer service module and a UAV management module. The Netty file transfer service module is constructed based on a Netty framework and a transmission control protocol (TCP), and implements functions such as automatic reconnection, breakpoint resume, file reception, photographing instruction transmission, and heartbeat detection.

The improved YOLOv4 algorithm is implemented by performing the following steps.

(1) Obtain an image of a target object (such as a vehicle or a vessel) under vision of a UAV, and mark the obtained image by using a marking tool, to obtain a marked file and a marked picture.

(2) Perform anchor boxes clustering on the acquired annotation files to obtain new execution files.

(3) Modify a configuration file based on to a quantity of to-be-trained targets, and use the new execution file obtained in step (2) to train a model of the marked file and the marked picture in step (1), to generate a weight file.

(4) Use a TensorRT accelerating reasoning device to accelerate reasoning on the trained model, the new execution file obtained in step (2), and the generated weight file, to obtain a reasoning model and an engine file. Accelerating reasoning on the trained model is mainly a process of deleting a useless layer and merging similar layers of the trained model.

(5) Load the reasoning model and the engine file for high-speed and high-precision target identification.

Particularly, the UAV in this system is used only as a carrying and power supply platform, and the system obtains the image and position information by using the cameras and the GPS module that are separately assembled. Therefore, in this system, it is not necessary to pay too much attention to the UAV, and a UAV pilot only needs to control a remote control and pay attention to a flight state by using DJI GO App. The specific process is as follows:

Step 1: Based on a local weather condition, a flight environment, and an identification requirement, a user formulates an appropriate flight plan, and reports the flight plan to the Air Traffic Control Bureau for approval before performing a flight mission. The UAV pilot detects a state of the UAV, opens the DJI GO App, turns on the remote control, starts the UAV, and turns on a TX2 development board. Then a researcher ensures that connection is established between a UAV client and a UAV management server, and ensures that the user can access the server by using an IP address.

Step 2: The UAV pilot controls the UAV to take off, and the researcher starts a corresponding program. In this case, if the remote user does not manually control photographing, a camera automatically photographs, that is, the UAV client sends an image acquisition instruction every 3 seconds, and then invokes a GPS module. If GPS information is returned, an image is acquired. If no GPS information is returned, an error "GPS is not started normally" is reported. If the user remotely controls photographing (manual photographing), no automatic photographing is performed temporarily.

Step 3: The images and position information obtained in step 2 are saved in a corresponding directory, an optimized YOLOv4 target identification algorithm is used to regularly scan the corresponding directory, unidentified images are identified in real time, and then position information corresponding to an identification result is saved to another directory.

Step 4: The UAV client establishes communication with a Netty file transfer server, encodes an identification result and position information and then transmits the identification result and position information to the server via an established local area network, and the server creates a folder by using an IP address and saves the identification result and position information.

Step 5: The user accesses a UAV management front end through IP login. Because the front end has established communication with the server, the information saved by the server can be accessed by the front-end user.

Step 6: After the flight mission ends, the UAV, the remote control and the DJI GO App are turned off. However, the user can still remotely access the acquired and saved data information via the IP address.

What is claimed is:

1. A system for real-time target identification of an unmanned aerial vehicle (UAV) based on an embedded technique and an improved You Only Look Once version 4 (YOLOv4) algorithm, comprising a UAV client, a UAV management server, and a UAV management front end, wherein the UAV client comprises a target identification client, a change detection client, and a target tracking client, wherein the target identification client comprises an image acquisition module, a target identification module, a storage module, and a file transfer module; the image acquisition module acquires position information and image data under vision of a UAV, the position information is acquired by a global positioning system (GPS) module, the image data is acquired through automatic photographing or manual photographing, the automatic photographing is completed after a preset photographing interval, and the manual photographing is to photograph after a photographing instruction from the UAV management server is received;

the position information and the image data obtained by the image acquisition module are transmitted to the target identification module, and the target identification module identifies a target and stores an identification result in the storage module; the file transfer module regularly scans the storage module to determine whether the identification result has been transmitted, encodes, if the identification result is not transmitted, the identification result in the storage module, converts an encoded identification result into a JavaScript Object Notation (JSON) data format, and transmits the data to a Netty file transfer service module; and when transmission is idle, the target identification client regularly sends a heartbeat signal to the UAV management server, to confirm whether the target identification client is normally connected to the UAV management server;

the change detection client comprises an image acquisition module, a change detection module, a storage module, and a file transfer module; the image acquisition module acquires position information and image data under vision of the UAV, the position information is acquired by the GPS module, the image data is acquired through automatic photographing or manual photographing, the automatic photographing is completed after a preset photographing interval, and the manual photographing is to photograph after a photographing instruction from the UAV management server is received; the position information and the image data obtained by the image acquisition module are transmitted to the change detection module, and the change detection module detects an image change and stores a detection result in the storage module; the file transfer module regularly scans the storage module to determine whether the detection result has been transmitted, encodes, if the detection result is not transmitted, the detection result in the storage module, converts an encoded detection result into a JSON data format, and transmits the data to a Netty file transfer service module; and when transmission is idle, the change detection client regularly sends a heartbeat signal to the UAV management server, to confirm whether the change detection client is normally connected to the UAV management server;

the target tracking client comprises an image acquisition module, a target tracking module, a storage module, and a file transfer module; the image acquisition module acquires position information and image data under vision of the UAV, the position information is acquired by the GPS module, the image data is acquired through automatic photographing or manual photographing, the automatic photographing is completed after a preset photographing interval, and the manual photographing is to photograph after a photographing instruction from the UAV management server is received; the position information and the image data obtained by the image acquisition module are transmitted to the target tracking module, and the target tracking module determines a target and stores a determining result in the storage module; the file transfer module regularly scans the storage module to determine whether the determining result has been transmitted, encodes, if the determining result is not transmitted, the determining result in the storage module, converts an encoded determining result into a JSON data format, and transmits the data to a Netty file transfer service module; and when transmission is idle, the target tracking client regularly sends a heartbeat signal to the UAV management server, to confirm whether the target tracking client is normally connected to the UAV management server;

the UAV management server comprises a Netty file transfer service module and a UAV management module, and the UAV management module comprises UAV management, information management, and photographing management; the Netty file transfer service module receives data transmitted by the UAV client and then decodes and restores the data, and then transmits the data to the UAV management module; the UAV management module performs information management on the received results and position information data, creates an "identification result folder", a "detection result file", and a "determining result folder", and stores corresponding results and position information into corresponding folders; the Netty file transfer service module detects a heartbeat sent by the UAV client and feeds back a current connection state, the heartbeat detection result is transmitted to the UAV management, and online information and last-heartbeat interaction information of the client are stored to the UAV management; the Netty file transfer service module implements automatic connection between the client and the server after a network of the UAV client and the UAV management server is interrupted and then restored; when a network interruption occurs during file transfer, the Netty file transfer service module implements continued transmission; after receiving a "manual photographing" request from the UAV management front end, the photographing management in the UAV management module sends a photographing instruction to the Netty file transfer service module, and the Netty file transfer service module converts the photographing instruction into a Json data format, and transmits the data to the image acquisition module by using a heartbeat, to implement manual photographing; and the UAV management front end is used to implement UAV information search, picture display, and control of manual photographing; and the UAV management front end searches a client of interest by using an IP address, to obtain online information, last-heartbeat interaction information, and results and position information data of the client, and displays the results and position information data of the client in pictures;

wherein the improved YOLOv4 algorithm is implemented by the following steps:

obtaining images of a target object under vision of the UAV, and marking the obtained images by using a marking tool, to obtain annotation files and annotation pictures;

performing anchor boxes clustering on the annotation files to obtain execution files;

modifying configuration files based on to a quantity of to-be-trained targets, and training a model based on the annotation files and the annotation pictures by using the execution files to generate weight files;

accelerating reasoning on the trained model, the execution files, and the generated weight files using a Tensor Runtime (TensorRT) accelerating reasoning device to obtain a reasoning model and an engine file; and loading the reasoning model and the engine file for high-speed and high-precision target identification.

2. The system according to claim 1, wherein the UAV client communicates with the UAV management server via a local area network; and the UAV management server communicates with the UAV management front end via a hypertext transfer protocol (HTTP).

3. The system according to claim 1, wherein the UAV client is arranged on UAVs, the UAV management server and the UAV management front end are ground-based, and the UAV management front end accesses each client of the UAVs by using an Internet protocol (IP).

* * * * *